US009455949B2

(12) United States Patent
Lawson et al.

(10) Patent No.: US 9,455,949 B2
(45) Date of Patent: *Sep. 27, 2016

(54) METHOD FOR PROCESSING TELEPHONY SESSIONS OF A NETWORK

(71) Applicant: Twilio, Inc., San Francisco, CA (US)

(72) Inventors: Jeff Lawson, San Francisco, CA (US); John Wolthuis, San Francisco, CA (US); Evan Cooke, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/176,426

(22) Filed: Feb. 10, 2014

(65) Prior Publication Data

US 2014/0153565 A1 Jun. 5, 2014

Related U.S. Application Data

(63) Continuation of application No. 13/021,645, filed on Feb. 4, 2011, now Pat. No. 8,649,268.

(51) Int. Cl.
*H04L 12/26* (2006.01)
*H04L 29/12* (2006.01)
*H04L 29/06* (2006.01)

(52) U.S. Cl.
CPC ......... *H04L 61/106* (2013.01); *H04L 65/1069* (2013.01)

(58) Field of Classification Search
None
See application file for complete search history.

(56) References Cited

U.S. PATENT DOCUMENTS

| 5,274,700 A | 12/1993 | Gechter et al. |
| 5,526,416 A | 6/1996 | Dezonno et al. |
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 6,026,440 A | 2/2000 | Shrader et al. |

(Continued)

FOREIGN PATENT DOCUMENTS

| DE | 1684587 A | 3/1971 |
| EP | 0282126 A | 9/1988 |

(Continued)

OTHER PUBLICATIONS

RFC 3986: Uniform Resource Identifier (URI): Generic Syntax; T. Berners-Lee, R. Fielding, L. Masinter; Jan. 2005; The Internet Society.

(Continued)

*Primary Examiner* — Kwang B Yao
*Assistant Examiner* — Juvena Loo
(74) *Attorney, Agent, or Firm* — Jeffrey Schox

(57) ABSTRACT

A method for processing telephony sessions of a network including at least one application server and a call router, the method including the steps of assigning a primary Uniform Resource Identifier (URI) and at least a secondary URI to an application; mapping a telephony session to the primary URI; communicating with the application server designated by the primary URI using an application layer protocol; receiving telephony instructions from the application server and processing the telephony instructions with the call router; detecting an application event; and upon detecting the application event, communicating with the application server designated by the secondary URI.

21 Claims, 6 Drawing Sheets

(56) References Cited

U.S. PATENT DOCUMENTS

| | | |
|---|---|---|
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Johnson et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |

(56) References Cited

U.S. PATENT DOCUMENTS

| | | |
|---|---|---|
| 7,668,157 B2 | 2/2010 | Weintraub et al. |
| 7,672,295 B1 | 3/2010 | Andhare et al. |
| 7,675,857 B2 | 3/2010 | Chesson |
| 7,676,221 B2 | 3/2010 | Roundtree et al. |
| 7,715,547 B2 | 5/2010 | Ibbotson et al. |
| 7,742,499 B1 | 6/2010 | Erskine et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,024,785 B2 | 9/2011 | Andress et al. |
| 8,046,823 B1 | 10/2011 | Begen et al. |
| 8,069,096 B1 | 11/2011 | Ballaro et al. |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,319,816 B1 | 11/2012 | Swanson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,565,117 B2 | 10/2013 | Hilt et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,649,268 B2 | 2/2014 | Lawson et al. |
| 8,667,056 B1 | 3/2014 | Proulx et al. |
| 8,675,493 B2 | 3/2014 | Buddhikot et al. |
| 8,695,077 B1 | 4/2014 | Gerhard et al. |
| 8,755,376 B2 | 6/2014 | Lawson et al. |
| 8,767,925 B2 | 7/2014 | Sureka et al. |
| 8,806,024 B1 | 8/2014 | Francis et al. |
| 8,837,465 B2 | 9/2014 | Lawson et al. |
| 8,838,707 B2 | 9/2014 | Lawson et al. |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,964,726 B2 | 2/2015 | Lawson et al. |
| 9,014,664 B2 | 4/2015 | Kim et al. |
| 9,015,702 B2 | 4/2015 | Bhat |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0198941 A1 | 12/2002 | Gavrilescu et al. |
| 2003/0006137 A1 | 1/2003 | Wei et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0165569 A1 | 8/2004 | Sweatman et al. |
| 2004/0172482 A1 | 9/2004 | Weissman et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0218748 A1 | 11/2004 | Fisher |
| 2004/0228469 A1 | 11/2004 | Andrews et al. |
| 2004/0240649 A1 | 12/2004 | Goel |
| 2005/0005200 A1 | 1/2005 | Matena et al. |
| 2005/0010483 A1 | 1/2005 | Ling |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0125251 A1 | 6/2005 | Berger et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008073 A1 | 1/2006 | Yoshizawa et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0129638 A1 | 6/2006 | Deakin |
| 2006/0143007 A1 | 6/2006 | Koh et al. |

(56) References Cited

U.S. PATENT DOCUMENTS

| | | |
|---|---|---|
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | Mcqueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0201426 A1 | 8/2008 | Darcie |
| 2008/0209050 A1 | 8/2008 | Li |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0037204 A1 | 2/2010 | Lin et al. |
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |

(56) References Cited

U.S. PATENT DOCUMENTS

| | | |
|---|---|---|
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0143714 A1 | 6/2011 | Keast et al. |
| 2011/0145049 A1 | 6/2011 | Hertel et al. |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0036476 A1 | 2/2013 | Roever et al. |
| 2013/0047232 A1 | 2/2013 | Tuchman et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0058806 A1 | 2/2014 | Guenette et al. |
| 2014/0064467 A1 | 3/2014 | Lawson et al. |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0365480 A1 | 12/2015 | Soto et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| EP | 2053869 A1 | 4/2009 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

NPL, "API Monetization Platform", 2013.
Kim et al. "In- service Feedback QoE Framework" 2010 Third International Conference on Communication Theory. Reliability and Quality of Service. pp. 135-138. 2010.
Matos et al. "Quality of Experience-based Routing in Multi-Service Wireless Mesh Networks" Realizing Advanced Video Optimized Wireless Networks. IEEE. pp. 7060-7065. 2012.
Tran et al. "User to User adaptive routing based on QoE" ICNS 2011: The Seventh International Conference on Networking and Services. pp. 170-177. 2011.

(56) References Cited

OTHER PUBLICATIONS

Nu et al. "Quality Evaluation in Peer-to-Peer IPTV Services" Data Traffic and Monitoring Analysis, LNCS 7754. pp. 302-319.2013.
Complaint for Patent Infringement, *Telinit Technologies, LLC* v. *Twilio Inc.*, dated Oct. 12, 2012.
S. barakovic and L. Skorin-Kapov. "Survey and Challenges of QoE Management Issues in Wireless Networks". 2012, pp. 1-29.
Subramanya, et al. "Digital Signatures", IEEE Potentials, Mar./Apr. 2006, pp. 5-8.
"Ethernet to Token ring Bridge"—Black Box Corporation, Oct. 1999 http://blackboxcanada.com/resource/files/productdetails/17044.pdf.

```
GET /foo.php HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIGURE 4A

```
POST /foo.php HTTP/1.1
Host: demo.twilio.com
Content-Type: application/x-www-form-urlencoded
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 11

Digits=1234
```

FIGURE 4B

```
GET /foo.php?digits=1234 HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIGURE 4C

```
GET /foo.php HTTP/1.1
Host: demo.twilio.com
X-Twilio-SMSid=DE870AD708ED70AE87D0AE7DAD7
X-Twilio-SMSSenderID=415-555-1212
X-Twilio-SMSShortCode=11111
X-Twilio-AccountId=AAF4AF5AF8A9A885449F7A647AF84
Content-Length: 0
```

FIGURE 4D

```
GET /foo.php HTTP/1.1
Host: demo.twilio.com
X-Twilio-SMSid=DE870AD708ED70AE87D0AE7DAD7
X-Twilio-SMSSenderId=415-555-1212
X-Twilio-SMSShortCode=11111
X-Twilio-AccountId=AAF4AF5AF8A9A885449F7A647AF84
Content-Length: 21

Message=statusrequest
```

FIGURE 4E

```
GET /foo.php?message=statusrequest HTTP/1.1
Host: demo.twilio.com
X-Twilio-SMSid=DE870AD708ED70AE87D0AE7DAD7
X-Twilio-SMSSenderId=415-555-1212
X-Twilio-SMSShortCode=11111
X-Twilio-AccountId=AAF4AF5AF8A9A885449F7A647AF84
Content-Length: 0
```

FIGURE 4F

```
                    XML Response

<?xml version="1.0" encoding="UTF-8"?>
<Response>
        <Collect
                successUrl="http://www.example.com/phonetree.php"
                numDigits="1"
                timeout=20
        >
                <Say voice="female">
For sales press one. For support press two. For the operator, press three.
                </Say>
        </Collect>
</Response>
```

FIGURE 5A

```
                    XML Response

<?xml version="1.0" encoding="UTF-8"?>
<Response>
        <sms address=415-555-555
                thanks for the your text, will call at 5 PM.
        </sms>
        <CallAtTime="17:00PST">
                Today
                        <Dial>415-555-5309</Dial>

</CallAtTime>
</Response>
```

FIGURE 5B

METHOD FOR PROCESSING TELEPHONY SESSIONS OF A NETWORK

CROSS REFERENCE TO RELATED APPLICATIONS

This application is a continuation of co-pending U.S. patent application Ser. No. 13/021,645, filed 4 Feb. 2011, the entirety of which is incorporated by reference herein.

TECHNICAL FIELD

This invention relates generally to the telephony field, and more specifically to a new and useful method for processing telephony sessions in the telephony field.

BACKGROUND

In recent years, telephony applications have become more integrated with web applications. Telephony platforms have enabled web developers to apply their skill sets in the field of telephony. New products and services have been offered leveraging this new technical capability. However, integrating web applications with telephony services have introduced new problems to the field of telephony. In telephony applications, users have higher expectations and application errors are not expected or tolerated. In a telephone call there is less opportunities to signal to a user of an error. Companies providing telephony applications can lose customers during an application error. Additionally, applications are unable to be integrated with a telephone session. This places an increase burden on developers and limits the capabilities of telephony applications. Thus, there is a need in the telephony field to create a new and useful method for processing telephony sessions. This invention provides such a new and useful method.

BRIEF DESCRIPTION OF THE FIGURES

FIGS. 4A-4C are examples of a HTTP GET request, a HTTP POST request, and a HTTP GET request, respectively;

FIGS. 4D-4F are examples of a HTTP requests; and

FIGS. 5A and 5B are examples of XML responses.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
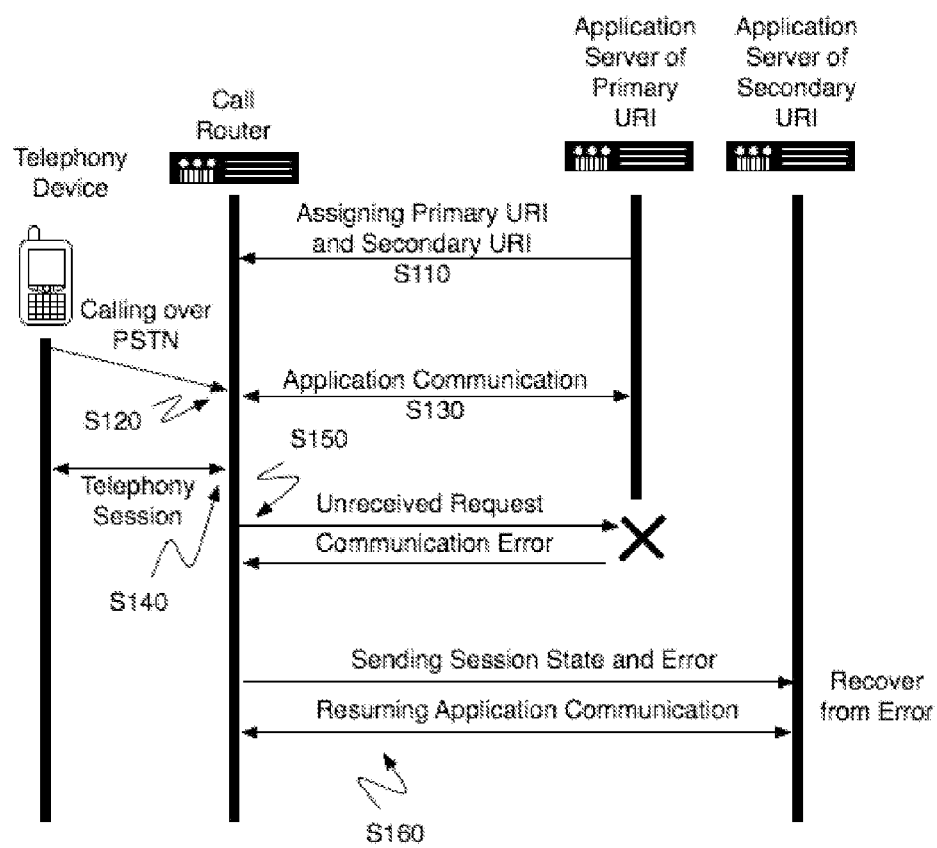
FIG. 1 is a schematic representation of a method of a preferred embodiment of the invention.
Figure 2:
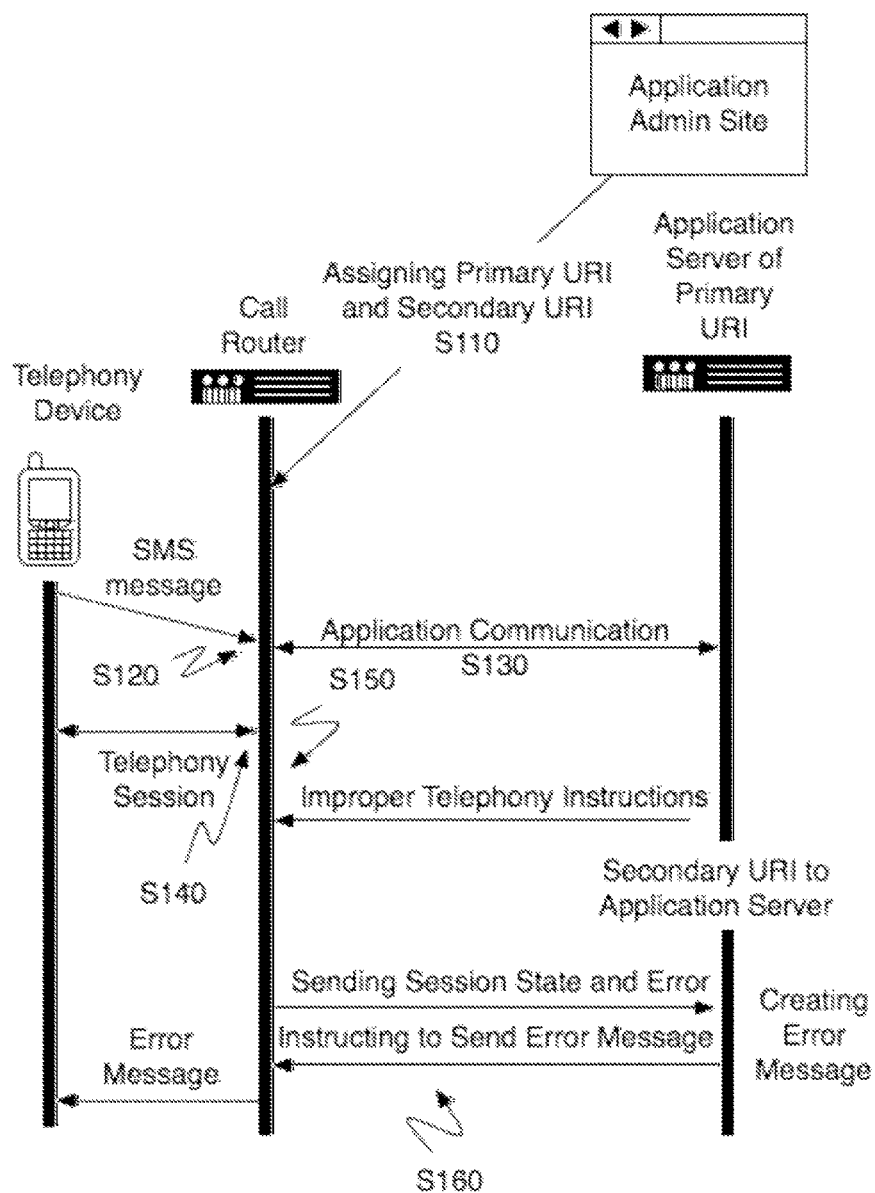
FIG. 2 is a schematic representation of a method of a preferred embodiment of the invention with a fallback URI.

As shown in FIG. 1, a method for processing telephony sessions of a preferred embodiment includes assigning a primary Uniform Resource Identifier (URI) and at least one secondary URI to an application Silo; mapping a telephony session to the primary URI S120; communicating with the application server designated by the primary URI using an application layer protocol S130; receiving telephony instructions from the application server and processing the telephony instructions with the call router S140; detecting an application event S150; and upon detecting the application event, communicating with the application server designated by the secondary URI S160. The method functions to redirect program flow to secondary or backup applications. In one embodiment the method functions to handle and possibly recover from errors that occur during a session of a telephony application, as shown in FIGS. 2A and 2B. For example, when an application error occurs, the secondary URI may be used as a fallback URI to take control of call control. In a second embodiment, the method functions to enable additional services to be updated during a call. For example, an outside service may store and process phone call recordings, and anytime a recording occurs on a telephony platform, the recording is sent to the outside service located at the secondary URI (i.e., a status callback URI). The method is preferably implemented within a telephony platform such as the one described in U.S. patent application Ser. No. 12/417,630, filed 2 Apr. 2009 and entitled "SYSTEM AND METHOD FOR PROCESSING TELEPHONY SESSIONS", which is hereby incorporated in its entirety by this reference. The method may, however, alternatively be implemented on any suitable system. The method is preferably used in systems that operate on a distributed system. For example, the telephony platform is preferably separate from the application server(s) hosting a specific application. An application event may be an application error, a state change during a telephony session, a particular telephony instruction or user action, or any suitable event. An application error could occur in communication between the telephony platform and the application server(s). Alternatively, application error may be customer error such as when the application server sends improperly formed or illegal instructions to the telephony platform. State change of a telephony session may alternatively be an application event that triggers communication with a status callback URI. The secondary URI may be to a server operated by the same entity as the application server or it may be an outside third-party service or any suitable server application. A status callback URI preferably does not alter the state of the telephony session but can be used as a supplementary tool for providing data to other services during a session. The method may be used for voice-based, short message service (SMS)-based, multimedia messaging service (MMS)-based, fax-based, or any suitable telephony network based communication.

Figure 3:
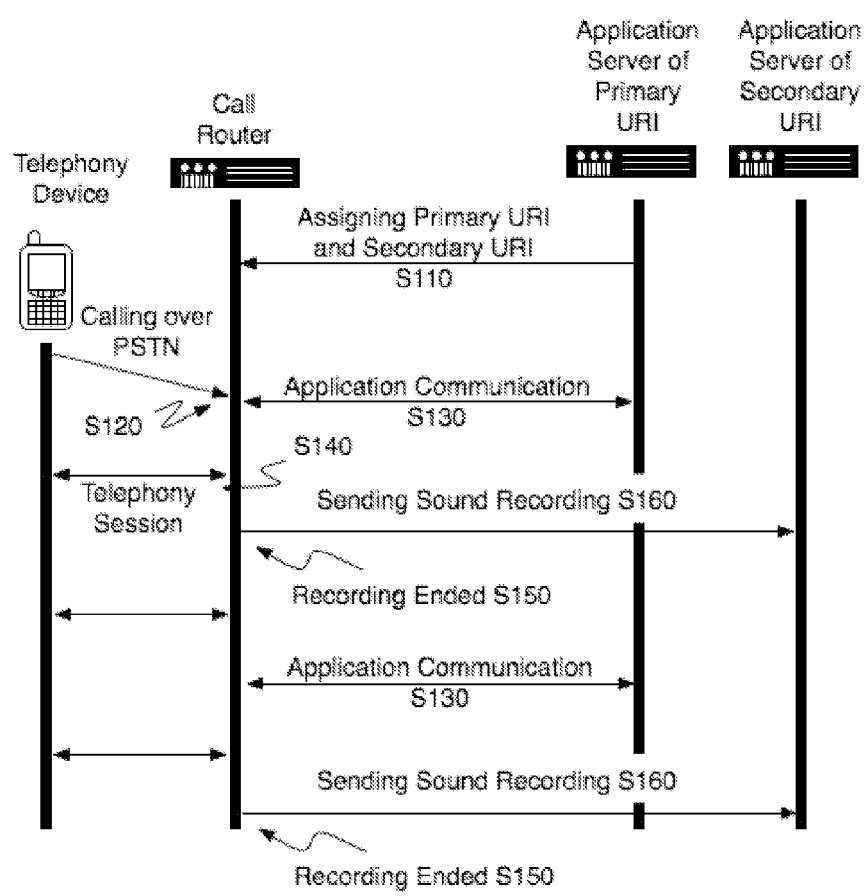
FIG. 3 is a schematic representation of a method of a preferred embodiment of the invention with a status callback URI.

Step S110, which includes assigning a primary Uniform Resource Identifier (URI) and at least a secondary URI to an application, functions to specify a URI for handling typical telephony application handling and a URI for handling a telephony application during a communication failure. The primary and secondary URIs are preferably universal resource locators (URL) that point to an application server or servers of the application operator. The primary URI and secondary URI may alternatively be any suitable address to resources of the telephony application. The URIs may be set within a settings interface for an application administrator. The URIs may alternatively be resources on a telephony platform for a particular telephony application. These resources are preferably accessible through an application programming interface (API) such as the API described in U.S. patent application Ser. No. 12/417,630. The primary URI preferably includes a default value of an initial URI. The initial URI is used for a new telephony session. This initial URI is preferably associated with an assigned telephony address (e.g., a phone number, SMS long code, SMS short code, etc.) that is used in determining what application server to manage a call. For example, when an incoming call is made to a phone number of an application, the initial URI associated with the phone number is used as the primary URI for the first communication message sent to the application server. The primary URI is preferably updated during a telephony session during the communication with the application. For example, a telephony command may be sent to the telephony platform instructing the telephony platform to gather the pressed digits during a phone call and to return the results to a new URI. The primary URI will preferably change to the new URI after the results are gathered. At the end of a telephony session the primary URI is preferably reset to the default initial URI. The primary URI may alternatively remain unchanged from the initial URI. The secondary URI as described may be an address to any suitable service. In one variation, the secondary URI is a fallback URI that preferably addresses error handling code/logic. The fallback URI is preferably hosted on a different application server in case the application server of the primary URI fails. In a second variation, the secondary URI is a status callback URI that preferably addresses a service that acts as a supplementary destination for telephony session data as shown in FIG. 3. Status callback URIs may be used for sending transcripts, recordings, telephony session call flow, numbers dialed, and/or any suitable aspect of a telephony session. A status callback URI is preferably registered for particular type of state change in a telephony session such as the ending of a recording, but may alternatively be for a plurality of types of events such as the start and end of any recording, transcription, and button input. These may be registered for all instances of an application or be registered during a particular telephony session of an application. They may be registered through telephony instructions, through an API, and/or through any suitable method. There may be a plurality of secondary URIs. One variation may allow specific errors or failures to be associated with specific fallback URIs. Another variation preferably uses multiple fallback URIs as redundant backups. For example, if after a primary URI fails a fallback URI is used, and if the fallback URI fails then the next fallback URI is used. Additionally, multiple status callback URIs may be used. A variety of third-party services may be used, each with a status callback URI for different events of a telephony application. Status Callback URIs, and fallback URIs may additionally be used in the same application, such that each application would be capable of providing status callbacks to various services and providing error handling code.

Step S120, which includes mapping a telephony session to the primary URI, functions to enable a telephony session to be converted into a format that may be handled with standard web servers and web applications. The mapping is preferably performed using a call router. An initial URI (e.g., default primary URI) is preferably pre-specified at the call router by a web application (which may be running on a third party server) or call router account owner. More preferably, the initial URI is assigned to the call via a unique identifier for the call destination, such as a DID (Direct Inbound Dial) phone number, or a VOIP SIP address. The URI may alternatively be specified by a remote server or other suitable device or method. In one variation, the URI may be used to encapsulate state information or a portion of state information from the initiated telephony session, such as the originating phone number, the dialed phone number, the date and time of the call, geographic location of the caller (e.g. country, city, state, and/or zip), and/or the unique call ID. The information included in the URI may be included in the form of a URI template. For example the URI default template could be: http://demo.twilio.com/myapp/{dialed phone number}/{originating phone number} or http://demo.twilio.com/myapp/foo.php?dialed_number={dialed phone number}& originating_number={originating phone number}.

Step S130, which includes communicating with the application server designated by the primary URI using an application layer protocol, functions to send and receive messages between the call router/telephony platform and the application server. The application control of a telephony session preferably occurs through the communication with the application server. The communication preferably includes the sending of requests to the application server; after the application server processes the request, receiving a response; and processing the response.

Preferably, a telephony session request is sent to the primary URI. During the initial request sent to the application, the default initial URI is preferably used. The request is preferably sent to a server over a network. In one variation, the request is sent to a local server on a local area network. In another variation, the request is sent to a server running locally on the device originating the call. In yet another variation, the request may be sent to multiple servers. The request preferably encapsulates at least a portion of the state information from the initiated telephony session, such as the originating phone number, the dialed phone number, the date and time of the call, geographic location of the caller (e.g. country, city, and/or state, zip), and/or the unique call ID. The request, more preferably, encapsulates all the state information of the call, but may alternatively include no state information or partial state information. The state information from the initiated telephony session is preferably sent via HTTP POST in the request body, HTTP GET in the request URI, HTTP header parameters to mimic the data flow of a web browser, or by any combination or suitable alternative way. If new state information is generated in the course of the operation of the call router, a request to the application server is preferably made to communicate the new state and to request new telephony instructions. Preferably, new state information is not kept or acted upon internally by the call router, but is passed to the application server for processing. Alternatively, partial state information is preferably stored on the call router until a fully updated state is achieved, and then communicated to the application server. For example, the application server may specify that multiple digits should be pressed on the keypad, not just one, before new call state is derived and communicated to the application server. In one variation, the information from the initiated telephone session may be a web-form submission included in the HTTP POST request. The request may include any state information from the telephony session, such as the originating phone number, the dialed phone number, the date and time of the call, and/or the unique call ID, the current status of the phone call (pending, in-progress, completed, etc.), or the results of a telephony action, including Dual Tone Multi Frequency (DTMF) digit processing, or a representation of or a link to a sound recording, or the status of the last command, or other call state. Examples of a HTTP GET request, a HTTP POST request, and a HTTP GET request are shown in FIGS. 4A, 4B, and 4C, respectively. Further examples of HTTP communication used for SMS messaging are shown in FIGS. 4D, 4E, and 4F. The HTTP request (or any suitable request communication) to the server preferably observes the principles of a RESTful design. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. The call router and/or the application server preferably do not need to remember or store previous communications to be aware of the state. Documents, media, and application state are preferably viewed as addressable resources, combined with data provide to the resource via request parameter, such as HTTP GET or HTTP POST parameters, or request body contents. Such request data may include an updated representation of the call resource, or other call state data generated as a result of call router operation, such as digits pressed on the keypad or audio recordings generated. State information included with each request may include a unique call identifier, call status data such as whether the call is in-progress or completed, the caller ID of the caller, the phone number called, geographic data about the callers, and/or any suitable data. However, a varying level of a RESTful communication (statelessness) may be used, such as by using cookies, session tracking, or any suitable devices to simulate a normal website visitor model. Preferably, data sent with each request may fully enable the application server to determine the next state of the call to execute. RESTfulness preferably does not preclude using external datasource, such as a database, to lookup additional data to log call meta data, or determine application logic.

The application server will preferably process the request and send a response to the call router. Thus Step S130 would include receiving a response from the application server. This response is preferably an HTTP response. The response is preferably sent as XML, audio binary, or raw text, but may alternatively be any sort of messaging format, including HTML, delimited text, key/value text or binary encoded format. The HTTP response preferably includes directions to perform telephony actions. The response may alternatively or additionally include a new URI or a new URI template to use as the primary URI with the telephony action in Step S140. An additional example XML response is shown in FIGS. 5A and 5B.

Step S140, which includes receiving telephony instructions from the application server and processing the telephony instructions with the call router, functions to convert the server response into telephony actions or executable operations during a telephony session. The telephony actions may include, for example, playing a pre-recorded sound file at a server-specified URI (such as a static mp3 file located at http://demo.twilio.com/myapp/1234.mp3), reading text to the caller using text-to-speech technology, calling another number (such as creating a new voice connection through the PSTN, SIP/VoIP, or other IP technology system), collecting digits via DTMF input, recording voice response audio, TTY or other inputs, sending an SMS message, or any suitable combination or sequence of these or other suitable actions. This conversion of the server response is preferably performed at a call router. Preferably, Step S120 includes processing the response mime-types associated with the server response. For example, if the response mime-type is XML, it is considered to be a set of call router instructions. If the response mime-type is MP3, it is considered a sound file to be played for the caller. If the response type is plain text, it is considered to be text to be read, via Text-To-Speech, to the caller.

Contents of the server response, such as an XML document, are preferably converted into a telephony action by processing the document sequentially (e.g. line by line). Telephony instructions are preferably contained within the document in the form of a markup language, such as XML as shown in FIGS. 5A and 5B. This sequential approach to processing a document of telephony instructions is enabled when the communication is stateless and all the necessary information is contained within the URI. This stateless communication preferably allows telephony instructions (verbs or commands) to be used as the programming interface for a server application performing telephony services. Algorithmic interpretation (based on the state of the communication) of the telephony verbs or the document is preferably not necessary. The telephony actions are preferably executed in the order of telephony instructions found in the contents of the server response. For example, an XML document may include the necessary verbs to carry out the telephony actions of reading text to a caller, monitoring keys pressed by the caller, and redirecting the caller to a new URI (i.e., an updated primary URI) using the pressed keys as part of the data within the new URI. Preferably, the telephony action (such as digits pressed) results in new state information, which may result in a repetition of some steps of the method, preferably beginning at Steps S120 or S130. The next URI is preferably provided by the server as part of the processing instructions. In another variation, the last URI is reused if the server fails to specify a next URI. In yet another variation, no repetition occurs if the server fails to specify a next URI, and processing continues below at the next call router instruction. The behavior may be determined by the nature of the call router instruction; for example, instructions that generate no new state information would not need to have a next URI since they don't trigger communication with a remote server. New state information may trigger an application event for the state change of the telephony session. A secondary URI and more specifically a status callback URI is preferably registered for a type of state change such as recording beginning or recording end. When a secondary URI is registered for a particular state change, then that state change will be detected in Step S150. The telephony actions preferably result in the repetition of step S130 with the new URI resulting from Step S140, but may alternatively initiate a repetition of one or more steps of the method. Step S130 is preferably repeated using all new phone session state information resulting from execution of a telephony action, such as digits pressed, a recorded audio file, or the success or failure of any telephony action requested. Repetition also includes all state information that remains relevant during the course of the session, such as Caller, Called, unique Call ID, and call status. The state information may also be represented in the form of a URI Template. For example, if the server response specifies that the call router should collect DTMF digits, and specifies that the next URL is the URI Template http://demo.twilio.com/foo.php?digits={Digits}, and the caller presses 1234. the resulting URI is http://demo.twilio.com/foo.php?digits=1234. Similarly, if the server response specifies the URI Template: http://demo.twilio.com/myapp/{Digits}.mp3, the resulting HTTP Request could be to a static mp3 file located at: http://demo.twilio.com/myapp/1234.mp3. Thus, a call may be controlled by one server that issued the telephony instruction and a second server that processes the response. Such call control hand-offs constitute the transfer of state information between servers in the form of a URI and accompanying request data, such as GET, POST, and/or request body. Preferably, all state communications conform to a syntax established by the call router to facilitate integration between multiple servers. For example, digits pressed on the keypad are preferably communicated to application servers in an identical fashion, thus minimizing the need for coordination between a multiple application servers with regard to how state is transferred. Alternatively, call router instructions may dictate the method of communicating new state information, such as the names and types of variables to send representing new state.

Step S150, which includes detecting an application event, functions to identify a trigger for use of a secondary URI. The application event may be an application error, a state change during a telephony session such as a particular telephony instruction or user action, or any suitable event. Detecting an application error functions to determine if the communication for a telephony application has encountered failure or fatal error. In one variation, the application error is a communication error. A communication error is preferably an inability to properly communicate with the application server. This may occur if the application server is not operating as shown in FIG. 2A. When the call router is attempting to send a request to the application server specified by the primary URI, a server error message is returned indicating a communication error has occurred. As another variation, the application error may be customer error. Customer error is an error in the operation of the telephony application due to malformed or improper messages from the application server as shown in FIG. 2B. This will commonly include syntax errors in the code of the application server. They may respond to a request with invalid or unparsable instructions. Other application errors may be any suitable error that occurs in a telephony application. The application event may alternatively be a state change such as a state change during a telephony session, a particular telephony instruction or user action, and/or any suitable event. State changes may include the start, end or changes in telephony sessions for transcripts, recordings, telephony session call flow, numbers dialed, buttons pressed, and/or any suitable aspect of a telephony session. A status callback URI may be registered for a particular type of event such as the ending of a recording, but may alternatively be for a plurality of types of events such as the start and end of any recording, transcription, and button input. Such events are preferably detected during the execution of the telephony instructions as described above, from user input, or through any suitable indicator of the state change.

Step S160, which includes communicating with the application server designated by the secondary URI upon application event, functions to use the secondary URI for handling aspects of the event. When application event triggers a secondary URI that is a fallback URI, the communication is preferably intended to handle an application error. When the secondary URI is a status callback URI, data related to the event is preferably sent to the service specified by the status callback URI. As mentioned above a plurality of secondary URIs may be assigned for an application. There may be a plurality of fallback URIs and/or a plurality of status callback URIs.

A fallback URI may be used to catch errors and recover or to gracefully inform a user in the telephony session of an error. Information about the telephony session is preferably included in the communication with the application server designated by the secondary URI. In one variation, the request last sent to the application server is preferably resent to the application server of the secondary URI. This will preferably include the same HTTP parameters, and may additionally include HTTP errors. Similar to how state is embedded in communication using the primary URI, state of the application at the time of the application error may be embedded in the secondary URI. The request may encapsulate at least a portion of the state information from the initiated telephony session, such as the originating phone number, the dialed phone number, the date and time of the call, geographic location of the caller (e.g. country, city, and/or state, zip), and/or the unique call ID. The request, more preferably, encapsulates all the state information of the call, but may alternatively include no state information or partial state information. The state information from the initiated telephony session is preferably sent via HTTP POST in the request body, HTTP GET in the request URI, HTTP header parameters to mimic the data flow of a web browser, or by any combination or suitable alternative way. Using the state information an application server may be capable of recovering the application state and proceed without ending a telephony session or starting over. In this variation, the fallback URI may result in communication that updates the primary URI. Or in other words, the telephony application may recover and continue with normal operation. Alternatively, a notification of the error may simply be sent to the secondary URI and a static response (e.g., an audio message informing user of the error) may be generically returned and played to the user before ending the call.

In the case of the communication error, the secondary URI is preferably hosted on a different server than that of the primary URI. The server of the secondary URI will ideally be operating even if the server of the primary URI stops operating. The server of the secondary URI may include a mirror or duplicate instance of the server of the primary URI. Thus when a communication error occurs control of the application may be moved over to the server of the secondary URI and proceed with normal operation from the perspective of the user without ending the telephony session.

In the case of customer error, the application server has provided malformed or improper messages from the application server or the application server has caused the telephony platform to halt execution of the telephony application. Similar to the communication error, the state information may be used to recover. However, the state information may alternatively be logged and used by the application developer in resolving errors in the application. Additionally, if the secondary URI fails another secondary URI may be used. Alternatively, a default error handling routine may be used within the telephony session. For example, a default message of the telephony platform may be played.

In the case of a state change application event, a telephony instruction, user action, or other indicator of the state change preferably has an associated status callback URI. Data associated with the state change is preferably communicated to an application server specified by the status callback URI. This status callback server may be operated by the same entity as the main application server, but may alternatively be operated by a third-party. The status callback server preferably receives the data and performs any suitable action. A reply is preferably not part of the communication, but continued communication between the telephony platform (e.g., call router) and the status callback server may occur. Preferably, the communication. In this variation, the telephony session is preferably uninterrupted, and the communication with the application server of the secondary URI (e.g., the status callback URI) happens in parallel to the communication with the application server of the primary URI. Some exemplary applications of a status callback URI would be to send data relating to audio recordings, transcriptions, telephony session call flow, numbers dialed, and/or any suitable aspect of a telephony session to a second application.

An alternative embodiment preferably implements the above methods in a computer-readable medium storing computer-readable instructions. The instructions are preferably executed by computer-executable components preferably integrated with a telephony platform preferably with a call router to mediate communication between telephony devices and an application server. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for processing a communication session comprising:
    assigning a primary application resource identifier and at least a status application resource identifier to an application;
    mapping a communication session to the application;
    communicating with an application server designated by the primary application resource identifier using an application layer protocol, wherein communicating with the application server comprises embedding at least a portion of state information of the communication session in a first application layer protocol request, sending the first request through an application layer protocol to an application resource identified by the primary application resource identifier, and receiving application instructions in an application server response;
    processing the application instructions into actions in the communication session; and
    upon an application status change event of the communication session, embedding at least a portion of state information of the communication session and the application event in a second application layer protocol request and sending the second request through an application layer protocol to an application resource identified by status application resource identifier.

2. The method of claim 1, wherein the application status change is during the communication session.

3. The method of claim 2, wherein sending the second request through an application layer protocol to the application resource identified by the status application resource identifier is performed in parallel to processing the application instructions into actions.

4. The method of claim 3, wherein embedding at least a portion of state information of the communication session and the application event in a second application layer protocol request comprises embedding at least a portion of state information at the time of the application status change in the second application layer protocol request.

5. The method of claim 1, wherein the application status change is the end of the communication session.

6. The method of claim 1, further comprising updating the primary application resource identifier during the communication session.

7. The method of claim 1, wherein processing the application instructions into actions in the communication session comprises transmitting a communication message.

8. The method of claim 7, wherein the communication message is a short message service (SMS) message.

9. The method of claim 1, wherein processing the application instructions into actions in the communication session comprises calling a second endpoint.

10. The method of claim 1, wherein the status application resource identifier may be registered for a plurality of types of state changes in a communication session.

11. The method of claim 1, further comprising creating call router resources accessible through a call router Application Programming Interface (API), wherein the primary application resource identifier and the status application resource identifier are call router resources.

12. The method of claim 1, further comprising assigning an error application resource identifier to an error event of the application; upon the error event occurring in the communication session, embedding at least a portion of state information of the communication session and an error identifier in a third application layer protocol request and sending the third request through an application layer protocol to an application resource identified by the error application resource identifier.

13. A method for processing a communication session comprising:
    assigning a primary application resource identifier and at least an error application resource identifier to an application;
    mapping a communication session to the application;
    communicating with an application server designated by the primary application resource identifier using an application layer protocol, wherein communicating with the application server comprises embedding at least a portion of state information of the communication session in a first application layer protocol request, sending the first request through an application layer protocol to an application resource identified by the primary application resource identifier, and receiving application instructions in an application server response;
    processing the application instructions into actions in the communication session; and
    upon an application error while processing the application instructions, embedding at least a portion of state information of the communication session from the time of the application error and an error identifier in a second application layer protocol request and sending the second request through an application layer protocol to an application resource identified by the error application resource identifier.

14. The method of claim 13, further comprising receiving a response to the second request, wherein the response to the second request includes a second set of instructions; and processing the second set of instructions into actions in the communication session.

15. The method of claim 14, wherein processing the second set of instructions into actions of the session comprises updating the primary URI of the session.

16. The method of claim 13, further comprising upon application error in communication with the secondary application identifier, using a default error handling routine within the communication session.

17. The method of claim 13, wherein the application error is a communication error when communicating with the application server designated by the primary URI.

18. The method of claim 13, wherein the application error is customer error of invalid application instructions in the first application layer protocol response.

19. The method of claim 13, further comprising initiating the communication session from a phone number through the Public Switched Telephone Network (PSTN).

20. The method of claim 13, further comprising initiating the communication session from a message received from a Short Message Service (SMS) system.

21. The method of claim 13, further comprising creating call router resources accessible through a call router Application Programming Interface (API), wherein the primary application resource identifier and error application resource identifier are call router resources.

\* \* \* \* \*